United States Patent
Gabaldon et al.

(10) Patent No.: US 10,047,900 B1
(45) Date of Patent: Aug. 14, 2018

(54) ADJUSTABLE STAND FOR CONTAINER

(71) Applicants: Steve Gabaldon, Aledo, TX (US);
Wesley Shook, Weatherford, TX (US)

(72) Inventors: Steve Gabaldon, Aledo, TX (US);
Wesley Shook, Weatherford, TX (US)

(73) Assignee: TRIPODUNIQUE, LLC, Aledo, TX (US)

( * ) Notice: Subject to any disclaimer, the term of this patent is extended or adjusted under 35 U.S.C. 154(b) by 0 days.

(21) Appl. No.: 15/615,513

(22) Filed: Jun. 6, 2017

Related U.S. Application Data (62) Division of application No. 14/965,999, filed on Dec. 11, 2015, now Pat. No. 9,671,059.

(60) Provisional application No. 62/090,629, filed on Dec. 11, 2014.

(51) Int. Cl.
| | |
|---|---|
| *F16M 11/32* | (2006.01) |
| *F16M 11/16* | (2006.01) |
| *F16M 11/04* | (2006.01) |
| *A47G 23/04* | (2006.01) |

(52) U.S. Cl.
CPC .......... *F16M 11/32* (2013.01); *A47G 23/04* (2013.01); *F16M 11/04* (2013.01); *F16M 11/16* (2013.01)

(58) Field of Classification Search
CPC ........ F16M 11/32; F16M 11/04; F16M 11/16; A47G 23/04
USPC ....... 248/127, 128, 136, 146, 149, 150, 151, 248/152, 155.2, 155.4, 160, 161, 163.1; 439/186; 220/628, 629, 476, 480, 475
See application file for complete search history.

(56) References Cited

U.S. PATENT DOCUMENTS

| | | | | |
|---|---|---|---|---|
| 575,902 | A * | 1/1897 | Nicholas | B65F 1/1415 248/165 |
| 1,138,141 | A * | 5/1915 | Oliver | A47G 7/025 220/630 |
| 2,767,757 | A * | 10/1956 | Marder | D06F 95/004 220/9.2 |
| 3,443,397 | A * | 5/1969 | Donovan | F25D 3/02 62/398 |
| 4,157,801 | A * | 6/1979 | Elmer | B65B 67/12 248/101 |
| 4,398,690 | A * | 8/1983 | Rutledge | F16M 11/38 108/28 |
| 4,461,504 | A | 7/1984 | Perez et al. | |
| 4,562,983 | A * | 1/1986 | Klefbeck | B65B 67/12 248/97 |

(Continued)

OTHER PUBLICATIONS

Office Action dated May 20, 2016 from counterpart U.S. Appl. No. 14/965,999.

(Continued)

*Primary Examiner* — Muhammad Ijaz
(74) *Attorney, Agent, or Firm* — James E. Walton (57) ABSTRACT

An adjustable stand system for a container includes a basket composed of a pliable material, the basket having a body that forms a cavity; an adjustable leg assembly having a plurality of legs; and a leg locking assembly. The leg locking assembly includes a member rigidly attached to the basket; a leg adapter configure to releasably engage with an adjustable leg of the adjustable leg assembly; and a pivot joint configured to pivotally engage the leg adapter to the member. A method includes securing the container to the cavity of the basket; and adjusting the height of the basket via the adjustable leg assembly.

2 Claims, 9 Drawing Sheets

(56) References Cited

U.S. PATENT DOCUMENTS

| | | | | |
|---|---|---|---|---|
| 4,632,241 | A * | 12/1986 | Brough | A47F 7/163 190/1 |
| 4,899,967 | A * | 2/1990 | Johnson | B65B 67/12 248/97 |
| 4,963,175 | A * | 10/1990 | Pace | A47G 23/04 62/372 |
| 5,078,350 | A * | 1/1992 | Zorichak | B65B 67/12 248/97 |
| 5,301,991 | A | 4/1994 | Chen et al. | |
| 5,813,927 | A | 9/1998 | Anglea | |
| 6,116,549 | A * | 9/2000 | Santa Cruz | B65B 67/12 248/97 |
| 6,148,999 | A * | 11/2000 | Olson | A63B 55/406 150/159 |
| 6,435,391 | B1 * | 8/2002 | Vazquez | B25H 3/02 248/146 |
| 7,293,748 | B1 * | 11/2007 | Hoser | F16M 11/28 248/125.8 |
| 7,341,164 | B2 | 3/2008 | Barquist et al. | |
| 7,350,671 | B2 * | 4/2008 | Mika | B67D 3/0009 222/129 |
| 8,430,284 | B2 * | 4/2013 | Broadbent | A45C 11/20 222/566 |
| 8,444,097 | B2 * | 5/2013 | Morrow | F16M 11/245 248/150 |
| 2003/0150964 | A1 * | 8/2003 | Sherer | B25H 3/02 248/146 |
| 2004/0011930 | A1 | 1/2004 | Tuohy, III et al. | |
| 2005/0279750 | A1 * | 12/2005 | Barquist | F16M 11/32 220/629 |
| 2007/0187435 | A1 * | 8/2007 | Quirk | B67D 3/0009 222/481 |
| 2007/0206115 | A1 * | 9/2007 | Kuo | F16M 11/32 348/373 |
| 2009/0206211 | A1 * | 8/2009 | Goodman | F16M 11/34 248/150 |
| 2010/0218670 | A1 * | 9/2010 | Keng | F41A 23/14 89/37.04 |
| 2010/0288908 | A1 | 11/2010 | McGraw | |
| 2012/0211501 | A1 * | 8/2012 | Ainsworth | A47G 23/04 220/592.25 |
| 2013/0233982 | A1 | 9/2013 | Morrow | |
| 2015/0114859 | A1 * | 4/2015 | Loudenslager | A63B 55/408 206/315.6 |

OTHER PUBLICATIONS

Amendment dated Aug. 22, 2016 from counterpart U.S. Appl. No. 14/965,999.

Notice of Allowance dated Dec. 9, 2016 from counterpart U.S. Appl. No. 14/965,999.

* cited by examiner

ADJUSTABLE STAND FOR CONTAINER

CROSS REFERENCE TO RELATED APPLICATIONS

This application is a divisional of U.S. application Ser. No. 14/965,999, filed 11 Dec. 2015, titled "Adjustable Stand for Container," which issued as U.S. Pat. No. 9,671,059 on 6 Jun. 2017, which claims the benefit of U.S. Provisional Application No. 62/090,629, filed 11 Dec. 2014, titled "Adjustable Stand for Container," all of which are hereby incorporated by reference for all purposes as if fully set forth herein.

BACKGROUND

1. Field of the Invention

The present application relates generally to support stands, and more specifically, to an adjustable support stand for a container.

2. Description of Related Art

Adjustable stands for containers are well known in the art and are effective means to elevate a container at a height relative to the ground surface. The supports generally include a plurality of legs configured to engage with the container or water cooler and ice chest via one or more locking mechanisms. A problem commonly associated with conventional stands is the bulkiness of size, which in turn limits use and shipment.

Accordingly, although an adjustable stand for a container does exist, significant shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional stand systems. Specifically, the system of the present application is configured to elevate a container, cooler, and/or other devices relative to the ground surface. The system includes a stand assembly having a plurality of legs configured to retract and telescope relative to a basket configured to retain the container or cooler, thereby allowing selective adjustment of the height and tilting of the container. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 1:
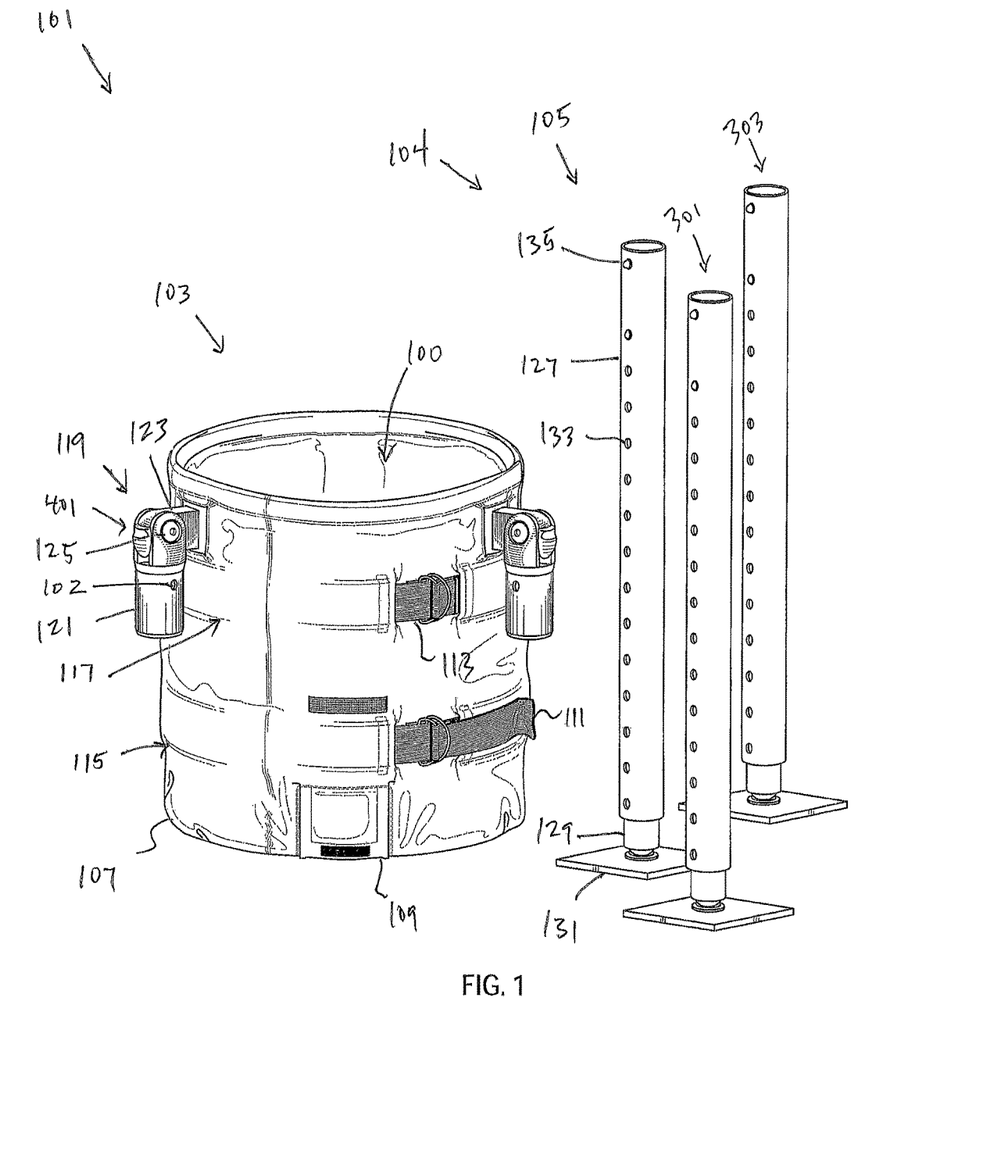
FIG. 1 is an oblique view of a disassembled container stand in accordance with a preferred embodiment of the present application.

Referring now to the drawings wherein like reference characters identify corresponding or similar elements throughout the several views, FIG. 1 depicts a cylindrical container stand system supporting a container. The container system 101 in accordance with a preferred embodiment of the present application. It will be appreciated that system 101 overcomes one or more problems commonly associated with conventional container stands.

In the preferred embodiment, system 101 includes a cylindrical shaped basket 103 and a leg assembly 104. When assembled, the leg assembly 104 engages with the basket 103, which in turn is adjusted to retain the container basket 103 at a height elevation relative to the ground surface.

Figure 3:
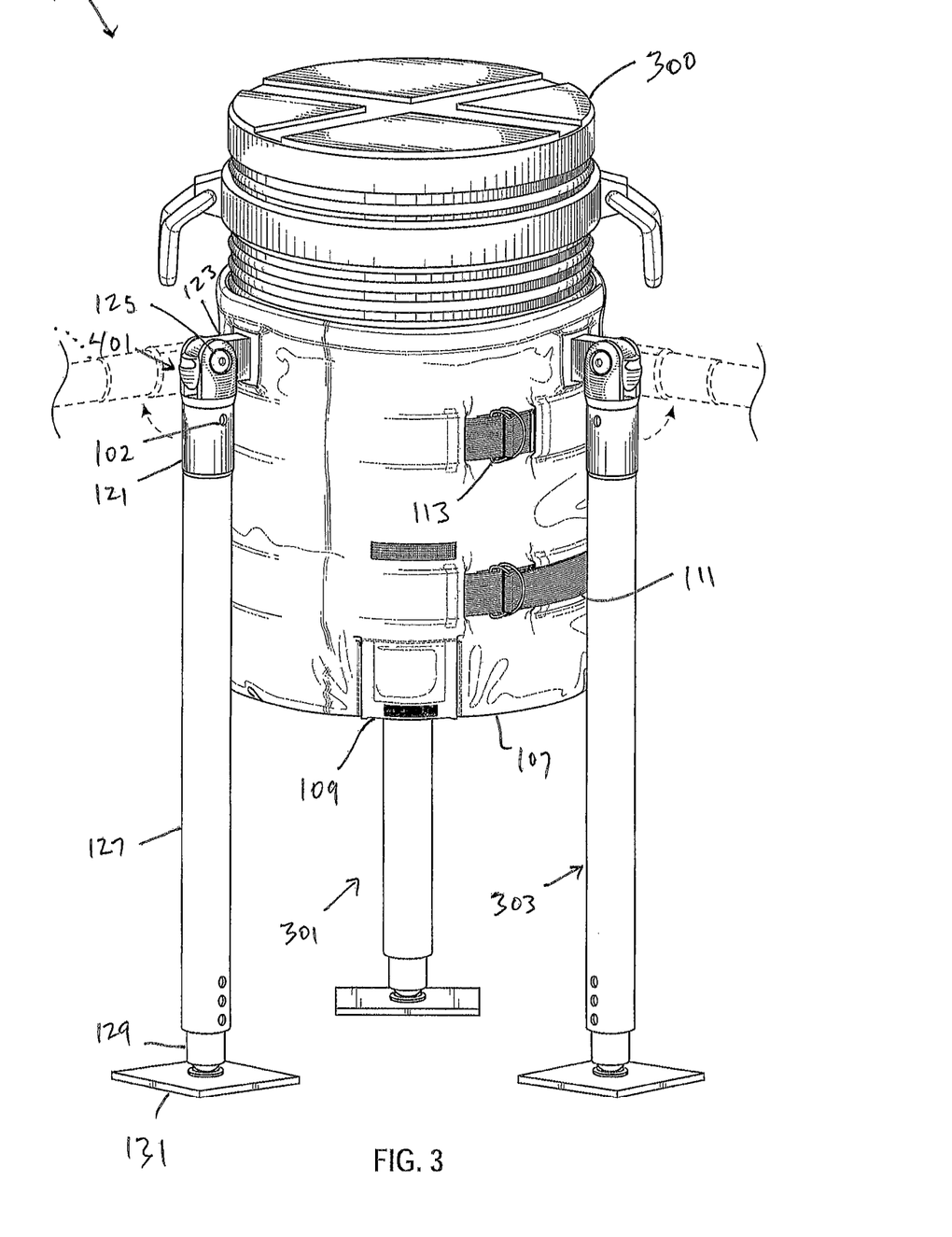
FIG. 3 is an oblique assembled view of the container stand of FIG. 1.
Figure 6:
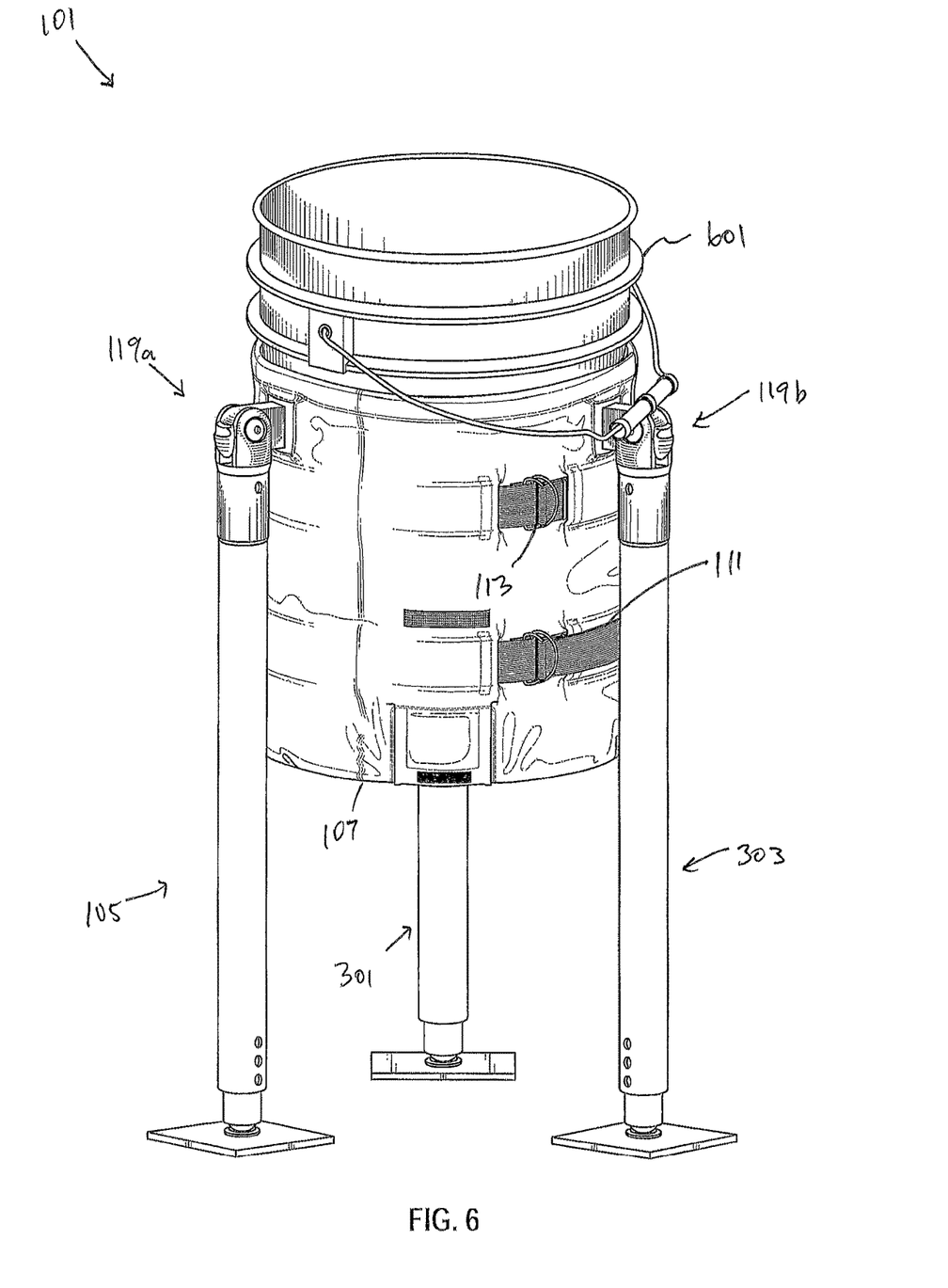
FIG. 6 is an oblique view of the assembled container stand of FIG. 1 with the legs in the retracted position.

Container basket 103 is preferably composed of a pliable, durable material that allows easy and rapid storage and folding during transport. The basket 103 has a body 107 that forms a cavity 100 that is generally cylindrical or rectangular in shape and that is adapted to receive a container therein, as depicted in FIGS. 3 and 6.

One of the unique features of body 107 is a door 109 extending through the thickness of the body 107 and adapted to provide access to a container spicket, e.g., spicket 501 of a water cooler 300. In the preferred embodiment, the door 109 could be composed of the same material as body 107 and retained in a locking position via a hook-loop fastener, clip, snap, and/or other suitable quick release devices.

Another unique feature believed characteristic of system 101 is the use of one or more adjustable straps 111, 113 extending around the periphery of body 107 and held in position via respective channels 115, 117 disposed within the thickness of the body 107. During use, the adjustable straps 111, 113 are manipulated to adjust the circumference of cavity 100, which in turn creates a snug fit between the container placed therein and body 107.

As depicted, the leg assembly 104 is releasably attached to the body 107. This feature allows the user to remove the legs during transport and storage. To achieve this feature, system 101 is provided with an adjustable leg locking assembly 119a, 119b, 119c rigidly attached to and extending from an outer surface of body 107. For the sake of clarity, one leg locking assembly 119a is shown in detail; however, all leg locking assemblies share the same features.

Leg locking assembly 119a includes a member 123 rigidly attached to body 107 and pivotally attached to a leg adapter 121 via a pivot joint 125. During use, the adapter engages with the leg via a locking hole 102 adapted to engage with a ball protrusion 135 secured to leg 105. A locking device 401 is used to secure the leg adapter 121 in a fixed position relative to the member 123.

In the contemplated embodiment, leg assembly 104 includes three adjustable legs 105, 301, and 303 adapted to engage with respective locking assemblies 119a, 119b, and 119c, as shown in FIG. 3. For the sake of clarity, the features of leg 105 are discussed in detail; however, it should be understood that each leg shares the same features.

Figure 5:
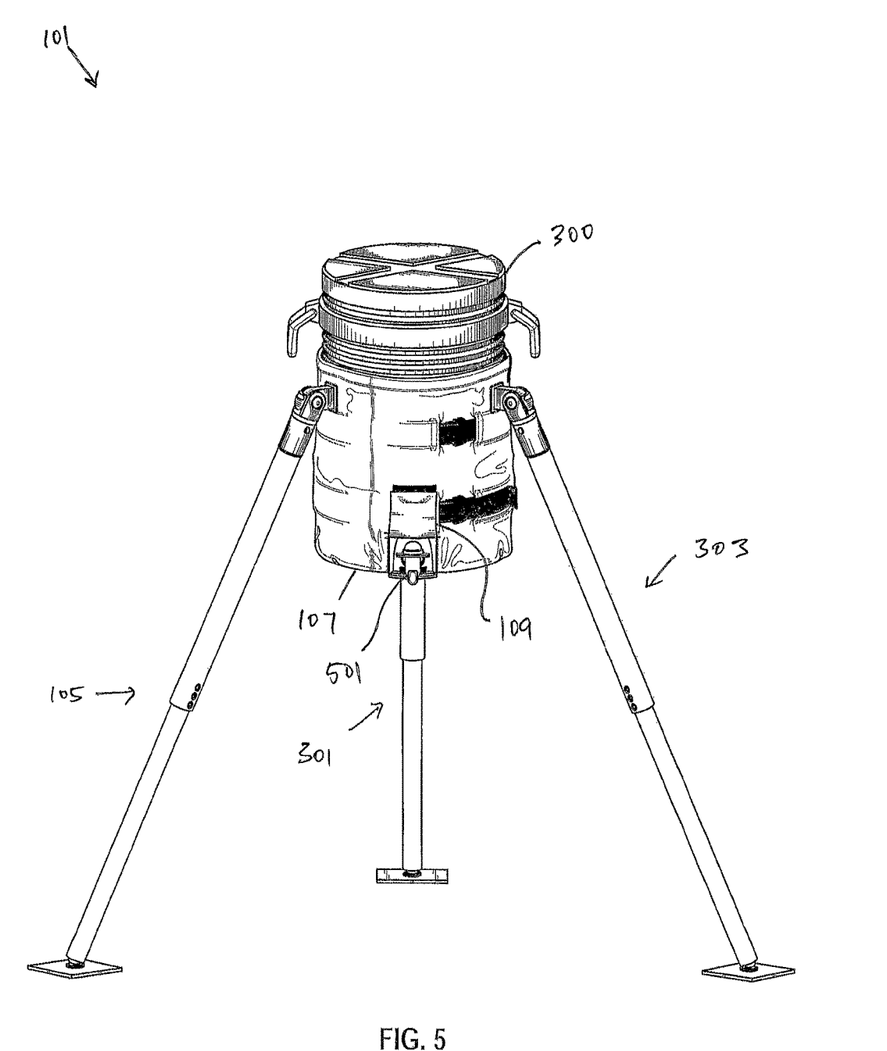
FIG. 5 is an oblique view of the assembled container stand of FIG. 1 with the legs in the extended position.

Leg 105 includes an outer cylindrical or rectangular housing 127 configured to telescopically engage with an inner cylindrical rod 129 attached to a base 131. In the preferred embodiment, a plurality of holes 133 extend through the thickness of the housing 127 and are adapted to receive a ball extending from rod 129. According, the ball-hole configuration enables the user to adjust the overall length of the leg 105 during use, as depicted in FIG. 5.

Figure 4:
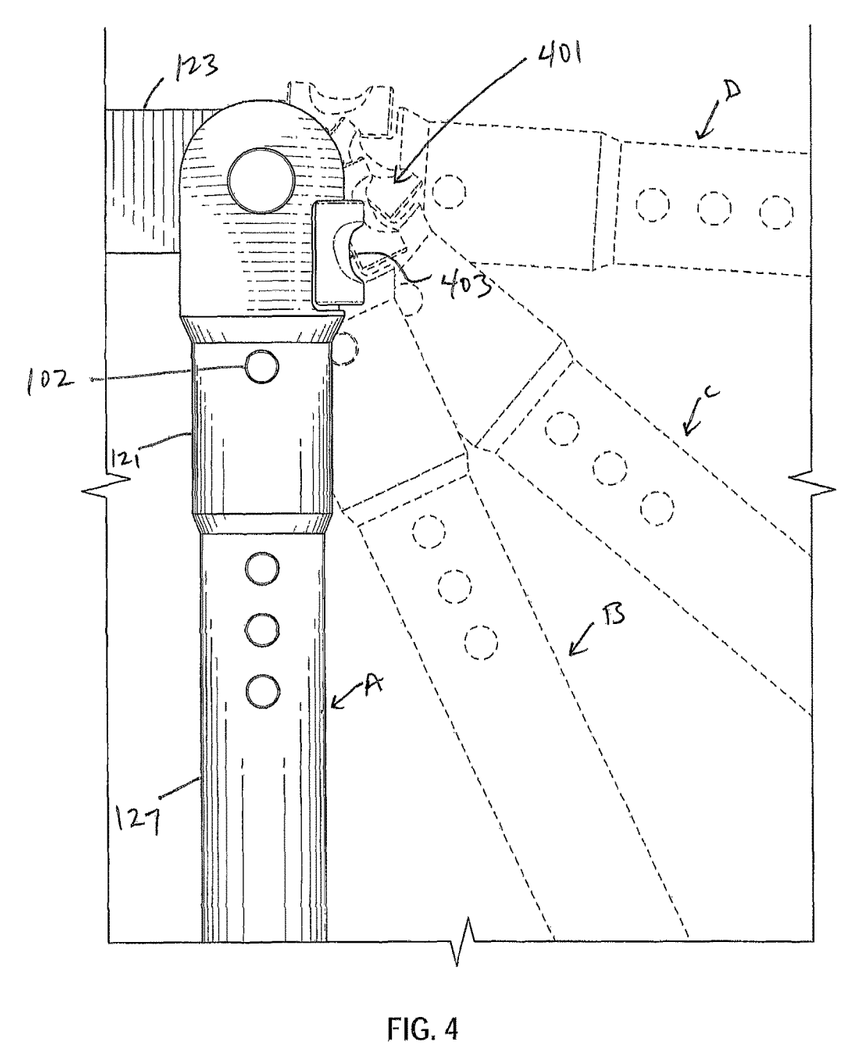
FIG. 4 is a side view of the locking assembly of the container stand of FIG. 1.

In FIG. 4, a side view of the leg locking assembly 119a is shown. In the illustrated drawing, the housing 127 is shown at angle positions A, B, C, and D. As discussed above, a locking device 401 is used to secure the leg in the various positions. This feature is achieved by pressing a button 403 operably associated with one or more devices adapted to releasably lock the adapter 121 in a fixed position relative to member 123.

Figure 7:
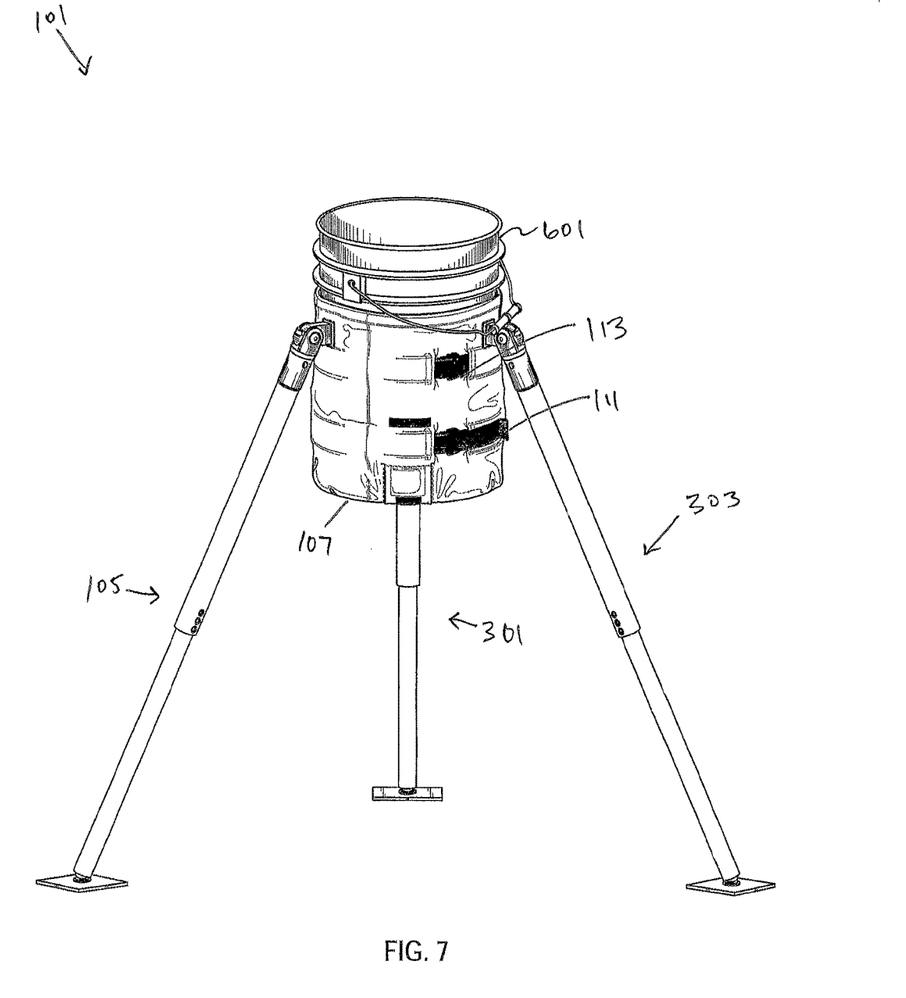
FIG. 7 is an oblique view of the assembled container stand of FIG. 5 with the spout door in the closed position.

In FIGS. 3 and 7, the system 101 is shown operably associated with two different types of containers 300 and 601. Accordingly, the containers can be open containers, coolers, and the like. Further, the features discussed herein could also be used to keep cavity 100 open and available for storage of items besides a container.

Figure 2:
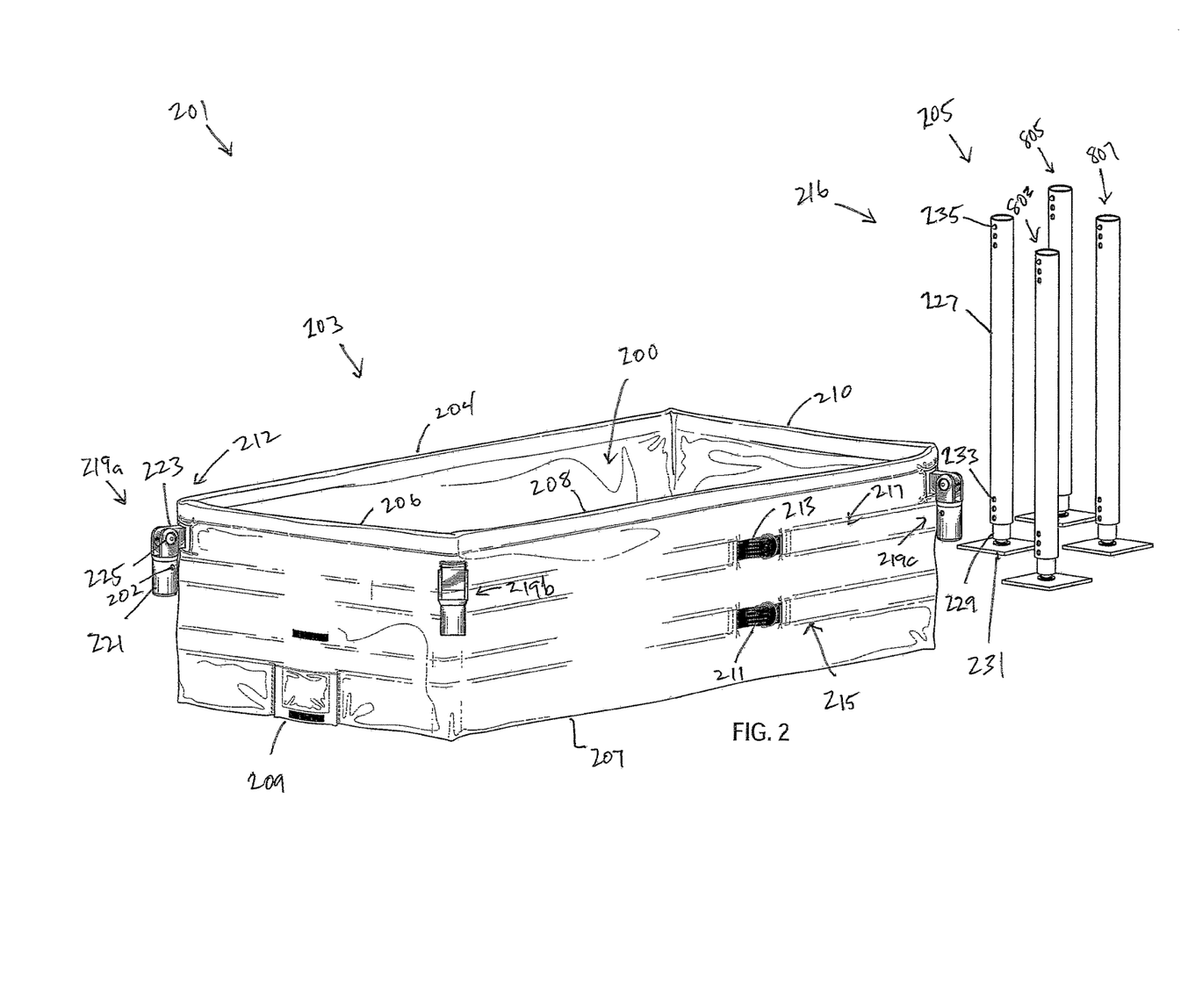
FIG. 2 is an oblique view of a disassembled cooler stand in accordance with an alternative embodiment of the present application.
Figure 8:
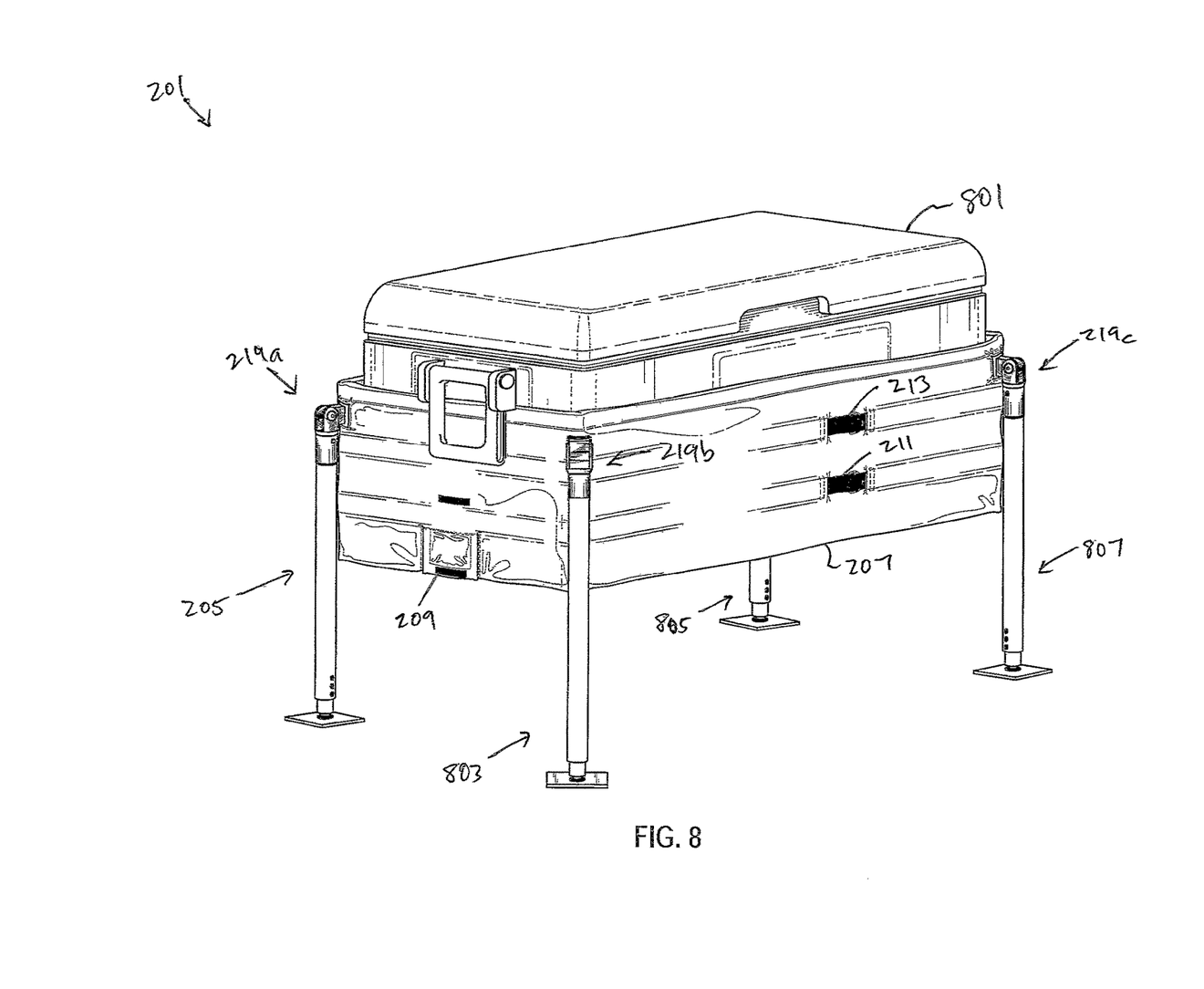
FIG. 8 is an oblique view of the assembled cooler stand of FIG. 2 with the legs in the retracted position.
Figure 9:
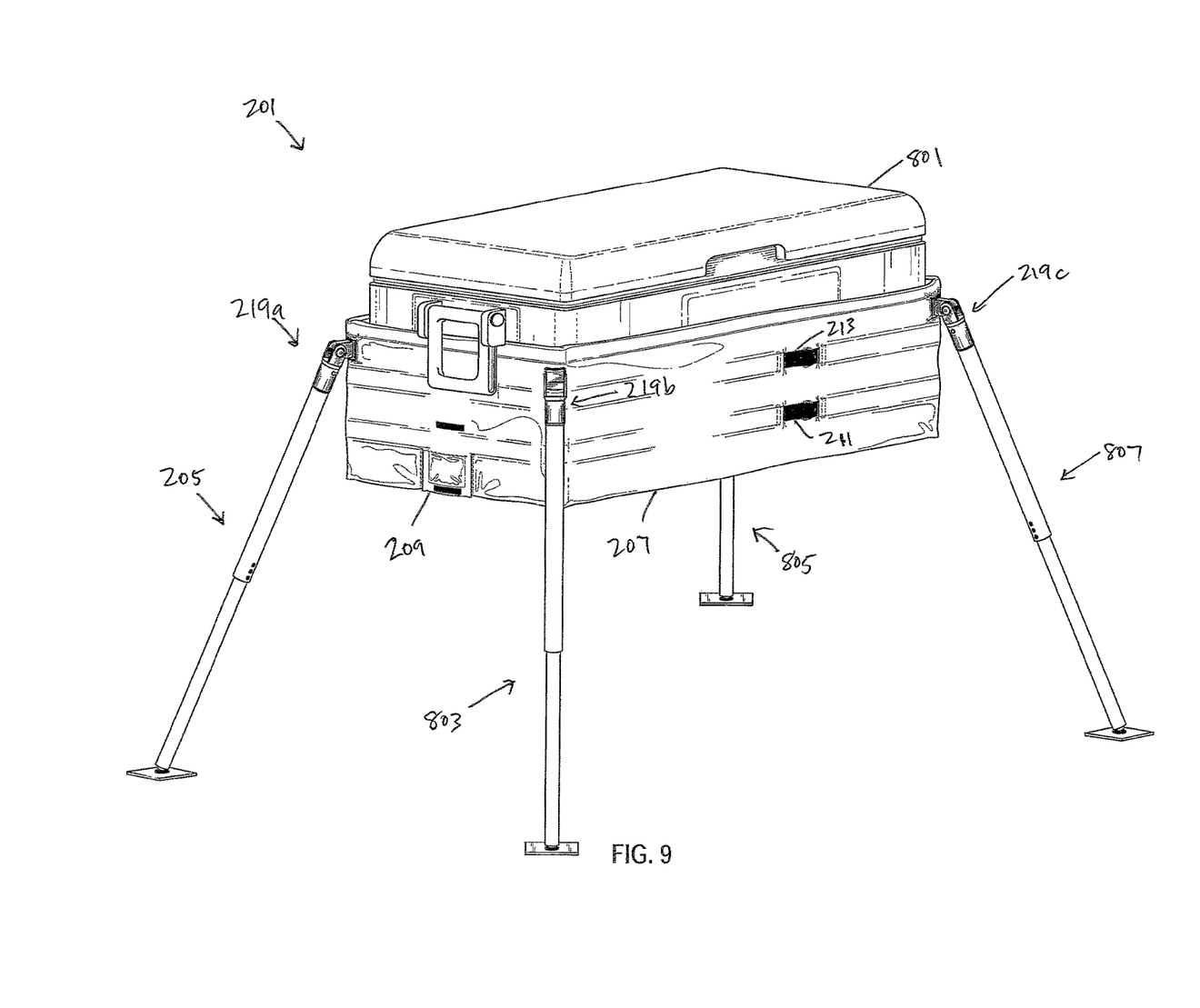
FIG. 9 is an oblique view of the assembled container stand of FIG. 8 with the legs in the extended position.

Referring now to FIGS. 2, 8, and 9 in the drawings, an alternative embodiment of system 101 is shown. System 201 is substantially similar in form and function to system 101 and incorporates one or more of the features discussed herein. In the exemplary embodiment, system 201 forms a rectangular cavity 200 adapted to receive cooler 801 with rectangular shapes.

In the preferred embodiment, system 201 includes a rectangular shaped basket 203 and a leg assembly 216. When assembled, the leg assembly 216 engages with the basket 203, which in turn is adjusted to retain the basket 203 at a height elevation relative to the ground surface.

Basket 203 is preferably composed of a pliable, durable material that allows easy and rapid storage and folding during transport. The basket 203 has a body 207 that forms a cavity 200 that is generally rectangular in shape and that is adapted to receive a container 801 therein, as depicted in FIG. 8. The body 207 includes four sides 204, 206, 208, and 210 integrally joined with each other and forming four corners, e.g., corner 212.

One of the unique features of body 207 is a door 209 extending through the thickness of the body 207 and adapted to provide access to a container spicket. In the preferred embodiment, the door 209 could be composed of the same material as body 207 and retained in a locking position via a hook-loop fastener, clip, snap, and/or other suitable quick release devices.

Another unique feature believed characteristic of system 201 is the use of one or more adjustable straps 211, 213 extending around the periphery of body 207 and held in position via respective channels 215, 217 disposed within the thickness of the body 207. During use, the adjustable straps 211, 213 are manipulated to adjust the circumference of cavity 200, which in turn creates a snug fit between the container placed therein and body 207.

As depicted, the leg assembly 216 is releasably attached to the body 207. This feature allows the user to remove the legs during transport and storage. To achieve this feature, system 201 is provided with an adjustable leg locking assembly 219a, 219b, 219c, and 219d rigidly attached to and extending from an outer surface of body 207. For the sake of clarity, one leg locking assembly 219a is shown in detail; however, all leg locking assemblies share the same features.

Leg locking assembly 219a includes a member 223 rigidly attached to body 207 and pivotally attached to a leg adapter 221 via a pivot joint 225. During use, the adapter engages with the leg via a locking hole 202 adapted to engage with a ball protrusion 235 secured to leg 205. A locking device similar to locking device 401 is used to secure the leg adapter 221 in a fixed position relative to the member 223.

In the contemplated embodiment, leg assembly 216 includes four adjustable legs 205, 803, 805, and 807 adapted to engage with respective locking assemblies 219a, 219b, 219c, and 119d, as shown in FIG. 9. For the sake of clarity, the features of leg 205 are discussed in detail; however, it should be understood that each leg shares the same features.

Leg 205 includes an outer cylindrical or rectangular housing 227 configured to telescopically engage with an inner cylindrical rod 229 attached to a base 231. In the preferred embodiment, a plurality of holes 233 extend through the thickness of the housing 227 and are adapted to receive a ball extending from rod 229. According, the ball-hole configuration enables the user to adjust the overall length of the leg 205 during use, as depicted in FIGS. 8 and 9.

Although referred to as a cooler and container, it will be appreciated that the features discussed herein could also be incorporated with other types of containers and should not be limited to merely a cooler and/or container.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method to secure a container at a height relative to a ground surface, the method comprising:
   an adjustable stand system for the container, comprising:
   a basket composed of a pliable material;
   an adjustable leg assembly having a plurality of legs;
   a leg locking assembly, having:
     a member rigidly attached to the basket;
     a leg adapter configured to releasably engage with an adjustable leg of the adjustable leg assembly; and
     a pivot joint configured to pivotally engage the leg adapter to the member; and
   a locking device operably associated with the leg locking assembly, the locking device being configured to secured the leg adapter in one of at least four fixed oriented positions relative to the member;
   securing the container to a cavity of the basket; and
   adjusting the height of the basket via the adjustable leg assembly.

2. The method of claim 1, further comprising:
   fastening the basket to the container via an adjustable strap.

* * * * *